United States Patent
Pang et al.

(10) Patent No.: US 10,637,752 B2
(45) Date of Patent: Apr. 28, 2020

(54) METHOD AND APPARATUS FOR TAP AGGREGATION AND NETWORK DATA TRUNCATION

(71) Applicant: Arista Networks, Inc., Santa Clara, CA (US)

(72) Inventors: James Chun Pang, Vancouver (CA); Travis Ryan Hammond, New Westminster (CA); Kevin Martin Amiraux, Burnaby (CA)

(73) Assignee: Arista Networks, Inc., Santa Clara, CA (US)

( * ) Notice: Subject to any disclaimer, the term of this patent is extended or adjusted under 35 U.S.C. 154(b) by 102 days.

(21) Appl. No.: 15/476,781

(22) Filed: Mar. 31, 2017

(65) Prior Publication Data
US 2018/0287900 A1   Oct. 4, 2018

(51) Int. Cl.
*H04L 12/26* (2006.01)
*H04L 12/24* (2006.01)

(52) U.S. Cl.
CPC ........ *H04L 43/026* (2013.01); *H04L 41/0893* (2013.01); *H04L 43/12* (2013.01); *H04L 43/022* (2013.01)

(58) Field of Classification Search
CPC ... H04L 43/026; H04L 41/0893; H04L 43/12; H04L 43/022
See application file for complete search history.

(56) References Cited

U.S. PATENT DOCUMENTS

| | | | | |
|---|---|---|---|---|
| 8,576,844 B1 * | 11/2013 | Ghosh | ................... | H04L 12/462 370/390 |
| 2009/0285091 A1 * | 11/2009 | Hiscock | .................. | H04L 41/00 370/230 |
| 2011/0128885 A1 * | 6/2011 | Breslin | ................. | H04L 43/028 370/253 |

OTHER PUBLICATIONS

"Truncation on Tap and Tool Ports", eos.arista.com, Dec. 10, 2014, 10 pages.

* cited by examiner

*Primary Examiner* — Michael A Keller
(74) *Attorney, Agent, or Firm* — Haley Guiliano LLP

(57) ABSTRACT

A method and apparatus of a network element that enables truncation of tap aggregation data via snoop actions. In one embodiment, a network element configured for tap aggregation includes a first tap port to couple with a tap switch, a set of tool ports to transmit network data received from the first tap port to a data analyzer, and data plane logic to manage a mapping between the first tap port and the set of tool ports. A first tool port in the set of tool ports is configured for egress truncation and the data plane logic performs a snoop action to truncate a first unit of network data to be forwarded to the first tool port and a forward action to forward a second unit of network data to a second tool port in the set of tool ports without truncation.

22 Claims, 13 Drawing Sheets

METHOD AND APPARATUS FOR TAP AGGREGATION AND NETWORK DATA TRUNCATION

FIELD OF INVENTION

This invention relates generally to data networking, and more particularly, to selectively performing network data truncation during tap aggregation.

BACKGROUND OF THE INVENTION

A network operator can build a monitoring network so as to attain improved visibility into application and network performance of this network. The monitoring network further enables improved security, compliance, and reporting for the network operator. To setup the monitoring network, existing switches have passive tap ports that mirror traffic to a tap aggregator. The tap aggregator provides traffic consolidation and source identification and directs selected traffic to specific analytical tools or storage services, including data analyzer tools. Data analyzer tools can be used to analyze the data so as to provide the analysis for the network operator as to the use, security, and performance of the network.

The flow of the data in the monitoring is unidirectional as the data flows from the existing switches to the tap aggregator and to the data analyzer. In this design, each of the switches will be coupled to the tap aggregator through a separate port on the tap aggregator. In addition, the tap aggregator switches the data received from the switches out different ports of the tap aggregator to the data analyzer based on the data characteristics being analyzed by the data analyzer. For example, the tap aggregator can switch the received traffic based on the protocols used for the data, such as source and/or destination headers for Link, Transport and Session layers as well as the potential for arbitrary patterns within datagram headers and/or payloads. Examples could be common protocols and address fields such as MAC and IP addresses, well known protocols such as Hypertext Transfer Protocol (HTTP), File Transfer Protocol (FTP), Secure Shell (SSH) and/or other known protocols.

For various reasons at least some of the data analyzers connected to the tap aggregator may wish to enable truncation for received data. Truncation removes unwanted or unneeded bytes from the packet at a configurable or fixed starting byte position, it may also be referred to as 'Packet Slicing.' Truncation is useful in situations where the data of interest is contained within the headers or early in the packet payload. Truncation can be used to remove all payload data in situations where regulatory compliance requires the removal of payload for data before storing captured traffic. Additionally, truncation enables a dramatic reduction in the volume of sampled data that is stored when payload data is not required.

SUMMARY OF THE DESCRIPTION

Embodiments described herein provide a method and apparatus for tap aggregation and network data truncation. One embodiment provides for a network element configured for tap aggregation that includes a first tap port to couple with a tap switch, a set of tool ports to transmit network data received from the first tap port to a data analyzer, and data plane logic to manage a mapping between the first tap port and the set of tool ports. A first tool port in the set of tool ports is configured for egress truncation and the data plane logic performs a snoop action to truncate a first unit of network data to be forwarded to the first tool port and a forward action to forward a second unit of network data to a second tool port in the set of tool ports without truncation.

One embodiment provides for a network system comprising a first set of network elements, each network element in the first set of network elements configured as a tap switch and an aggregation network element to receive network data from the first set of network elements and forward the network data to a set of data analyzers. The aggregation network element includes data plane logic to selectively truncate network data received from the first set of network elements via a snoop action before the network data is to be forwarded to the set of data analyzers via a set of tool ports.

One embodiment provides for a method of forwarding data on a network element. The method comprises receiving a unit of network data at a tap port of the network element, forwarding the unit of network data to a multicast group including multiple tool ports of the network element via data plane logic of the network element, and before forwarding the unit of network data to the multicast group, determining a truncation status for data to be forwarded to the multicast group and truncating the unit of network data via a snoop action when the multicast group is to receive truncated data.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
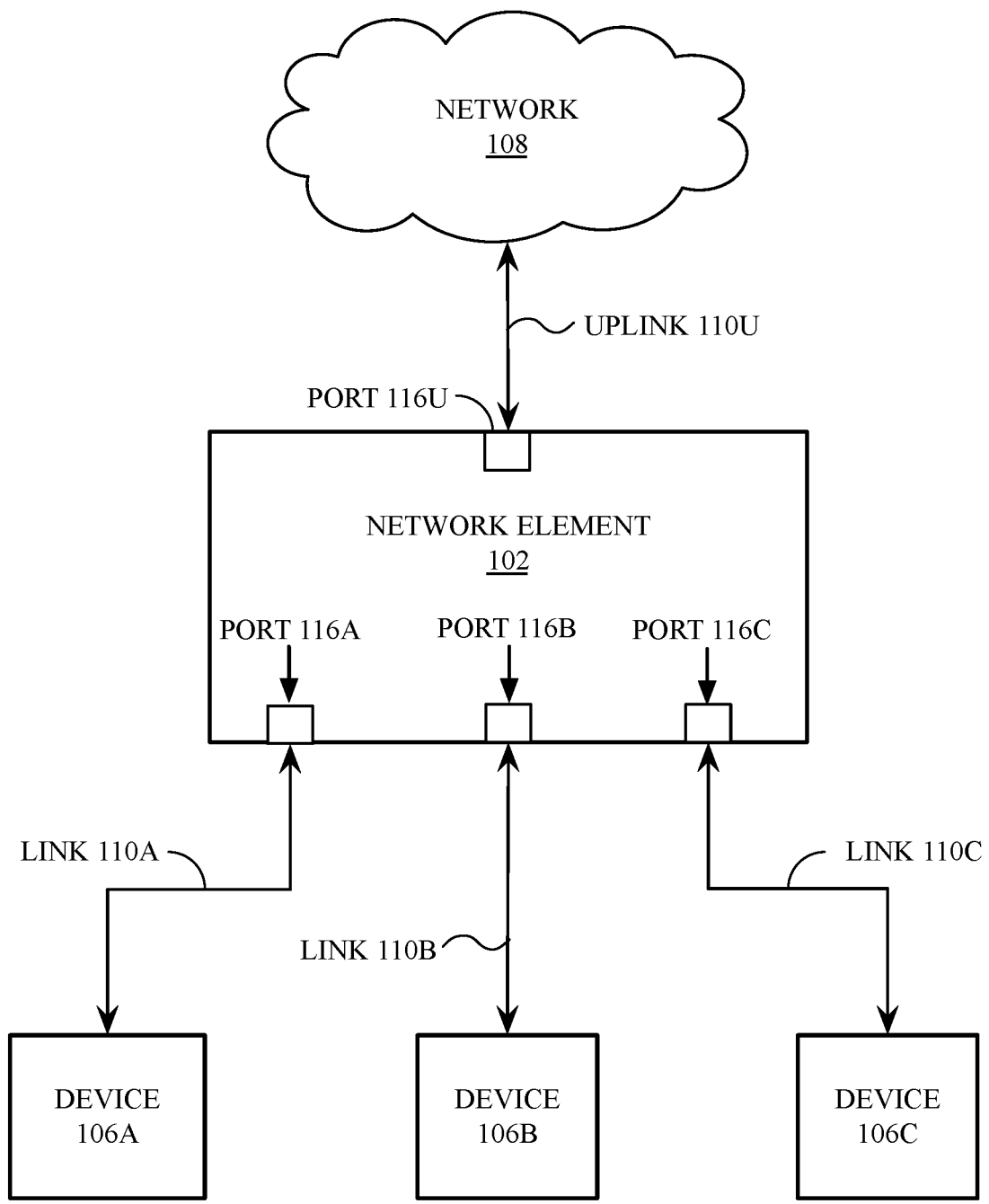
FIG. 1 is a block diagram of one embodiment of a system that includes a network element communicating network data between a network and a number of devices.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

Truncation or 'packet slicing' is the ability to remove unwanted or unneeded bytes from a unit of network data. Truncation may be useful in situations where the data of interest is contained within the headers or early in the packet payload. Truncation can be used to remove all payload data in situations where this can help in part to ensure legal or regulatory compliance with respect to the storage of captured data. Additionally, truncation can enable a dramatic reduction in the volume of sampled data stored where payload data is not required. Traditionally, network data truncation is enabled via media access control hardware associated with the network interface from which data is transmitted or received. In the existing art, where the media access control hardware lacks data truncation functionality, alternative methods of enabling truncation may not be available to the network element. In this example, if truncation is not available, truncation can be performed by forwarding a packet to the central processing unit (CPU) of the network element. This option, however, incurs a large performance penalty and the network element will not be able to truncate packets anywhere near the full line rate of an interface. Described herein is a method and apparatus for tap aggregation and network data truncation in which programmable mapping and filtering logic within a network element can be configured to selectively truncate and/or forward network data at or near the full capacity of some or all interfaces. The programmable mapping and filtering logic can perform truncation operations in the event the media access control hardware lacks all truncation capability or can enable emulation of any functionality that is unsupported by the media access control hardware.

In one embodiment, the programmable mapping and filtering logic can perform inspection and classification of a unit of network data, and apply a selective copy action conditionally. This selective copy action is referred to as a snoop action. The selective copying can copy some or all of a header of the unit of network data and/or copy some or the entire payload of the unit of data. For example and in one embodiment, the selective copy can copy the part of the header, the entire header, the header plus some of the payload of unit of network data, and/or a combination thereof.

In one embodiment, a snoop action can selectively copy this unit of network data to another unit of network data. In this embodiment, the programmable mapping and filtering logic applies the snoop action to selectively copies data from a unit of network data to another unit of network data. By selectively copying the data from one unit of network data to another, the original unit of data is not truncated and is available for normal forwarding. Instead, a second unit of network data represents the truncated original unit of data and can be forwarded to destinations that use the truncated data.

In one embodiment, a snoop action is a function available on a network processor to forward a copy of incoming data to an alternative destination distinct from the normal forwarding destination of such data. This function usually allows the selective copying of a portion of an incoming packet, at a configurable starting offset, for a configurable length. Such an action can be applied to all incoming traffic of an ingress interface, or selectively to a portion of the traffic matching some criteria (e.g. using programmable matching and filtering logic).

In one embodiment, the portion of data which is copied from the unit of incoming network data is governed by a snoop profile. In one embodiment, a snoop profile is a set of configurations for the snoop action.

Network System and Network Elements

FIG. 1 is a block diagram of one embodiment of a network system 100 that includes a network element 102 communicating network data between a network 108 and a number of devices 106A-C. In various embodiments, the network 102 is one or more of a switch, router, hub, bridge, gateway, etc., or any type of device that can provide access to a network 108 (e.g., physical network, virtualized network, etc.). In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines. In one embodiment, the network element 102 can also be a virtual machine.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. As described herein, where individual elements of network data are referenced (e.g., frames, datagrams, or packets, etc.) the techniques described are applicable to any discretely switched network data form of network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network element due to the processing time involved in buffering, queuing, processing and forwarding network data from a source port to a destination port in that network element.

Figure 2:
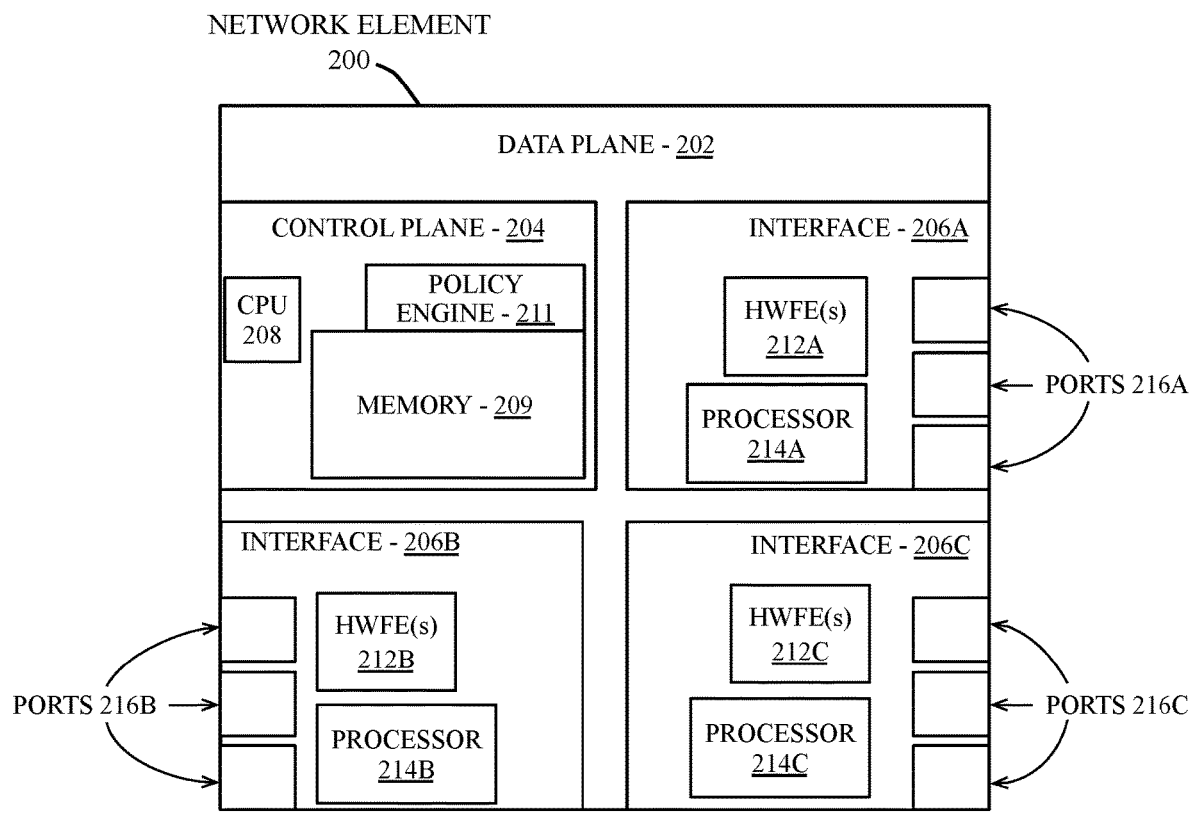
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. The CPU 208 is used to process information for the control plane 204 and writes configuration data for hardware forwarding engines 212A-C in the network interface devices 206A-C. Additionally, the CPU can read data from the hardware forwarding engines 212A-C. In one embodiment, the data plane 202 receives, processes, and forwards network data using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C includes multiple ports 216A-C that are used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processor 214A-C, and ports 216A-C, respectively. Each hardware forwarding engine 212A-C forwards data for the network element 200, performing routing, switching, or other types of network forwarding. Each processor 214A-C can be used to accelerate various functions of the interface devices 206A-C. For example and in one embodiment, the processors 214A-C can be configured to program corresponding hardware forwarding engines 212A-C. The processors 214A-C can also push data from the hardware forwarding engines 212A-C to a CPU 208 in the control plane 204.

In one embodiment, the control plane 204 gathers the configuration data for the hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C.

In one embodiment, the memory 209 that is used to store data for the control plane 204 is shared with the data plane 202. In one embodiment, the control plane 204 includes a policy engine 211 to apply a QoS policy to network traffic flowing through the network element 200. The policy engine 211 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 202 of each network element 200.

Tap Aggregation

Figure 3:
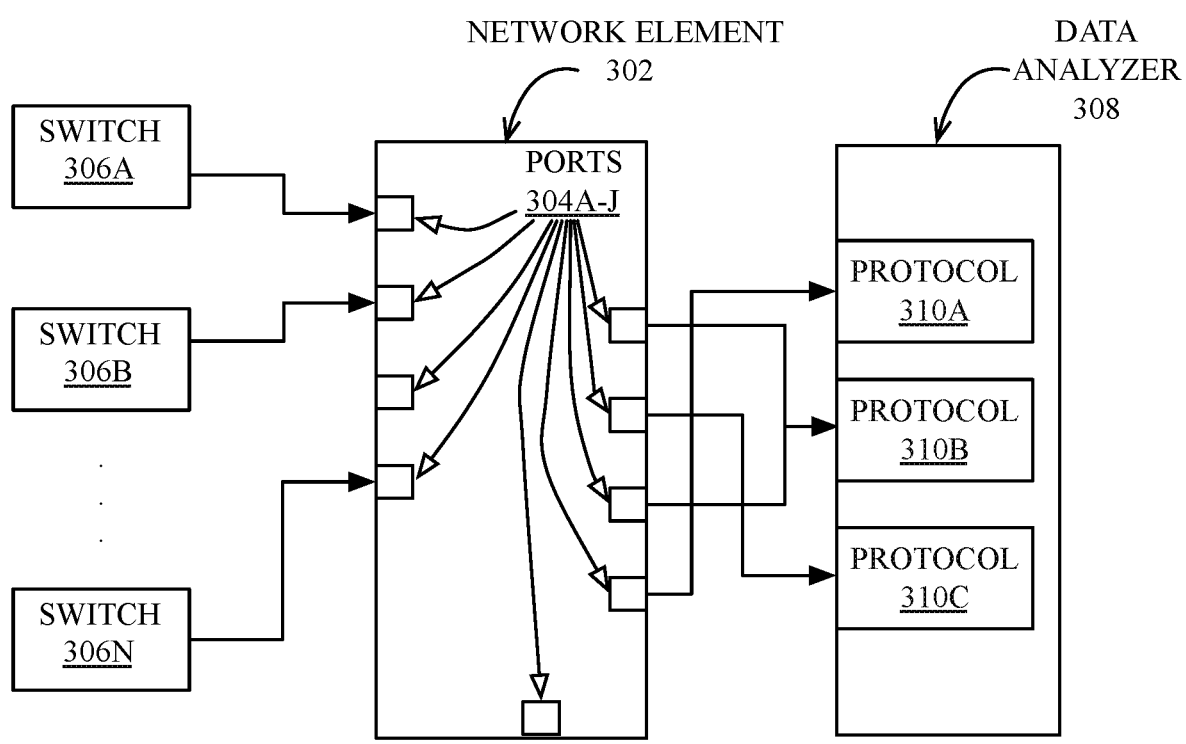
FIG. 3 is a block diagram of one embodiment of a system that aggregates ports for data analysis.

FIG. 3 is a block diagram of one embodiment of a network system 300 that aggregates ports for data analysis. In one embodiment, network system 300 includes switches 306A-N, which are coupled to network element 302. In one embodiment, the network element 302 is a similar to the network element 200 of FIG. 2 and the network element 102 of FIG. 1. The network element 302 is coupled to data analyzer 308. In one embodiment, the network element 302 is a tap aggregator that taps ports connected to switches 306A-N and unidirectionally forwards the data from these ports to the data analyzer 308. The ports connected to switches 306A-N can be referred to as tap ports. A port is a tap port if it is connected to a physical TAP or a mirror session from a tap switch, such as one of switches 306A-N. The ports connected to the data analyzer 308 are referred to as tool ports. A port is a tool port if the port is connected to a device, such as the data analyzer 308, that is capturing the data for analysis or archive.

In one embodiment, the filtering of traffic within a network element 302 configured as a tap aggregator is perform on a per-port basis using an access control module (ACM) or another form of mapping and/or filtering module, such as an access control list (ACL) module. Using the filtering module enables tap aggregation to be performed at high granularity and enables the selection of data associated with various layers and protocols (e.g., layer 2, layer 3, layer 4, etc.) on a per-port basis. For example, data having any one of protocols 310A-C can be selected by the ACM and sent to a specific port on the data analyzer 308.

The network element 302, as a tap aggregator, provides traffic consolidation and source identification and distribution of packets or other network data to a data analyzer 308. The network element 302 switches or forwards the data based on the characteristics of the data to be analyzed by the data analyzer 308. In one embodiment, the data analyzer 308 is a device that analyzes received data to provide analysis for the network operator regarding the use, security, and performance of the network. In such embodiment, data sent on each port is analyzed based on different characteristics (e.g., source and/or destination headers for Link, Transport and Session layers as well as the potential for arbitrary patterns within datagram headers and/or payloads. Examples could be common protocols and address fields such as MAC and IP addresses, well known protocols such as HTTP, FTP, SSH and/or other known protocols).

In one embodiment, each of the switches 306A-N is a switch that forwards traffic based on one or different protocols (layer 2 switching, layer 3 routing, or another type of forwarding based on header information stored in the data packets of the traffic). In one embodiment, each of the switches 306A-N can be a physical or virtual switch. In another embodiment, one or more of the switches 306A-N can be different types of sources (e.g., a passive, active, or virtual device that provides some or all of the traffic of interest). In one embodiment, one or more of the switches 306A-N can have a source that is a mirroring from network devices (e.g., traffic copied to a mirror destination or 'monitor' port or active/passive in-line taps (e.g., 'test access points') which themselves have no packet manipulation intelligence function and copy traffic towards network element 302. In one embodiment, the passive tap can be an optical tap. In another embodiment, the passive tap can be configured to enable mirroring functions.

In one embodiment, the data flow from switches 306A-N, to network element 302 and to data analyzer 308 is unidirectional. In this embodiment, the unidirectional dataflow means that the data is flowing in one direction, namely from switches 306A-N to network element 302 and to data analyzer 308. Because of the nature of this network arrangement, the data does not flow in the opposite direction. In one embodiment, the network element 302 includes ports A-J. Each of these ports 304A-J, includes receive and transmit interfaces. To avoid a scenario in which half of the port interfaces go unused due to unidirectional forwarding, one embodiment enables a bidirectional port to be split into two unidirectional ports. In such embodiment, a port of the network element 302 can be coupled to two different devices. For example and in one embodiment, one of the ports can be transmitting to a port of the data analyzer 308 and receiving data from one of the switches 306A-N.

Figure 4:
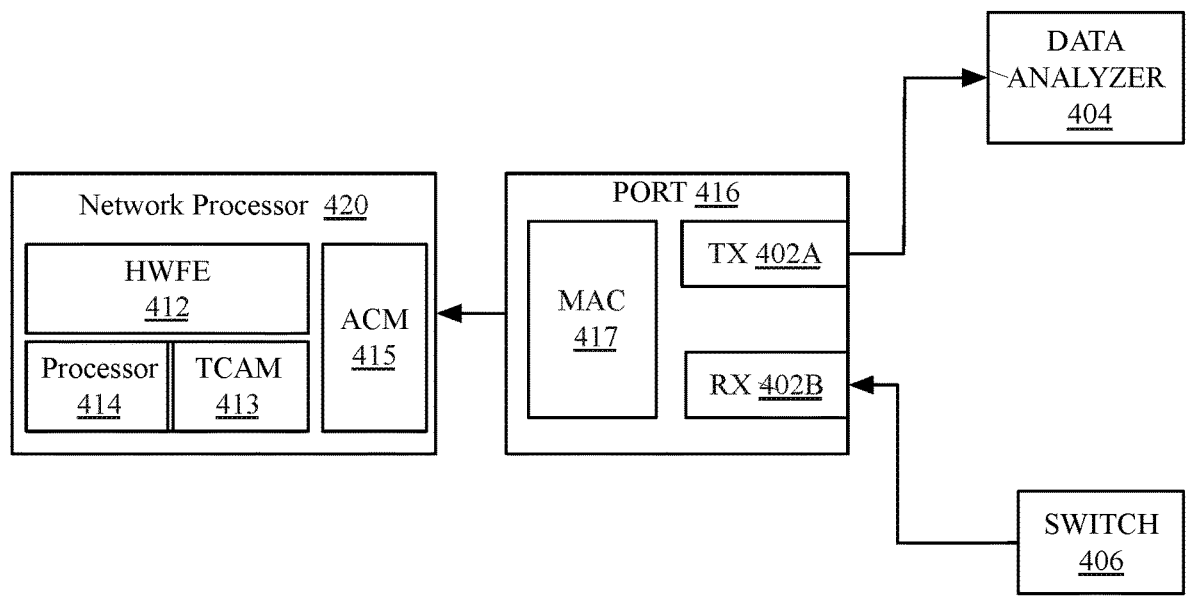
FIG. 4 is a block diagram of components of a network element capable of aggregation and truncation, according to an embodiment.

FIG. 4 is a block diagram of components of a network element capable of aggregation and truncation, according to an embodiment. A network element as described herein can include multiple ports and network processors, of which illustrated port 416 and network processor 420 are examples. The port 416 enables unidirectional traffic flow from a switch 406 to a data analyzer 404. In one embodiment, the port 416 is an example of one of ports 116A-C of FIG. 1, ports 216A-C of FIG. 2, and/or ports 304A-J of FIG. 3. The data analyzer 404 and the switch 406 can represent any of the switch and data analyzer devices described herein, such as any of switch 306A-N and the data analyzer 308 of FIG. 3. The port 416 includes a transmission interface (TX 402A) and receive interface (RX 402B). The illustrated port 416 is a split port, such that different interfaces of the port can couple with different devices. For example and in one embodiment, the RX 402B interface can couple with the switch 406 to receive tap data, while the TX 402A interface can be used to transmit data to the data analyzer. However, embodiments are not limited to the illustrated port configuration.

In one embodiment, each of the TX 402A and RX 402B interfaces couple with a media access control module (MAC 417). The MAC 417 implements media access control functionality for the TX 402A and RX 402B interfaces. In one embodiment, the MAC 417 can perform operations such as breaking a bit stream into frames/packets, checking for data errors, and finding the start of frame and end of frame delimiters. Forwarding decisions for data received via the port 416 can be determined in part via a network processor 420 coupled with the port 416. While the network processor 420 is illustrated as a component relative to the port 416, in some embodiments the network processor 420 includes one or more integrated instances of the port 416. For example and in one embodiment, the network processor 420 is a fabric access processor (FAP) that receives data via an integrated interface, processes and filters the received data, and submits the data over a switched fabric to the FAP that includes the destination port.

In one embodiment, the network processor 420 includes a hardware forwarding engine (HWFE 412), processor 414, a ternary content addressable memory module (TCAM 413), and an access control module (ACM 415) or another programmable mapping and/or filtering module or access control list (ACL) module. In one embodiment, the HWFE 412 and processor 414 can be any one of the hardware forwarding engines 212A-C or processors 214A-C as in FIG. 2. The TCAM 413 can store rules against which network data received at the port 416 may be evaluated.

The ACM 415 can be configured to use the TCAM 413 to perform various network data processing operations including virtual local area network (VLAN) filtering and tracking, applying policy based routing or traffic steering, and removing unneeded header fields from the data. For example, some data analyzer tools cannot parse multiprotocol label switching (MPLS) header. In one embodiment, the ACM 415 can be configured to pop the MLPS labels from data in addition to any other packet slicing or data truncation operations that are to be performed.

If a rule in the TCAM 413 matches a specified set of bits (e.g., source address, destination address, source port, destination port, etc.) within a received unit of network data, an action can be performed on the received unit of network data. The ACM 415 can store rules and actions in the TCAM 413 and the ACM 415 can perform an action on any data that matches a rule. The action can be an access control action that filters (e.g., permits, denies) traffic based on a set of predefined rules or forwards data to pre-determined destinations based on matching rules. The ACM 415 can be configured to map certain tap ports to a set of one or more tool ports. Generally, multiple tools will be interested in data from a specific tap port. Accordingly, the forwarding groups associated with a tap port is generally a multicast group of multiple ports. Additionally, ACM 415 can enable policy based routing to forward incoming traffic based upon predefined flow characteristics. In one embodiment, the ACM 415 can be configured to perform traffic steering operations to steer certain types of aggregated traffic from specific instances of the switch 406 to specific instances of the data analyzer 404.

Network Data Truncation

Based on the type of data to be analyzed or stored by the data analyzer, tap aggregation data that is forwarded to the data analyzer may be truncated. Truncation is the ability to remove unwanted or unneeded bytes from a packet or other unit of network data at a configurable or fixed starting byte position. Truncation is useful in situations where the data of interest is contained within the headers or early in the data payload of the packet. Truncation can also be used to remove all payload data in situations where network data is to be captured and stored, as truncation enables a dramatic reduction in the volume of sampled data stored where payload data is not required. Furthermore, legal and/or regulatory requirements regarding the capture and storage of network data may be relevant, such that payload data should be truncated from network data before the data is stored or archived.

Truncation can be implemented at ingress or egress. Ingress truncation truncates packets as the packets are received at the tap aggregator. For ingress truncation, a tap port can be configured to truncate all incoming data. When a tap port is configured to truncate ingress data, any data received at this tap port is truncated according to a configured policy that determines the specific byte offset to truncate the received data. Ingress truncation reduces the amount of data to be switched across the internal fabric, but any discarded data will not be available for use during the forwarding process. Egress truncation forwards the packet intact and removes payload data when the packet is transmitted from the egress interface. More data is handled by the tap aggregator, but that data is available for use to make forwarding decisions to determine which tool or tools to which the data is to be forwarded.

In one embodiment, the ACM 415 of the network module 420 can be specifically configured to perform truncation and forwarding for aggregated data. In one embodiment, a specific set of programmable mapping and filtering action can be performed via the ACM 415 and TCAM 413 to enable truncation. A first action is the "snoop" action. A snoop action, in one embodiment, the snoop action can be used to truncate data during the snoop to remove specific portions of header or packet data. The snoop action can further take advantage of an inspection and classification of the packet data. In one embodiment, the inspect and classification function can be performed by a ternary content-addressable memory (TCAM) that triggers an action, such as the snoop action.

A second action that can be used to enable tap aggregation and truncation is the "forward" action. The forward action can be configured to forward specific types of data received at a tap port to a specific set of ports. The forward action can be used to bypass the regular layer 2 or layer 3 forwarding pipeline and automatically shunt specific ingress data to specific egress ports. Where the snoop action is used to perform egress truncation, a tap port will truncate only the data that is destined to a tool port for which egress truncation is enabled.

Figure 5A:
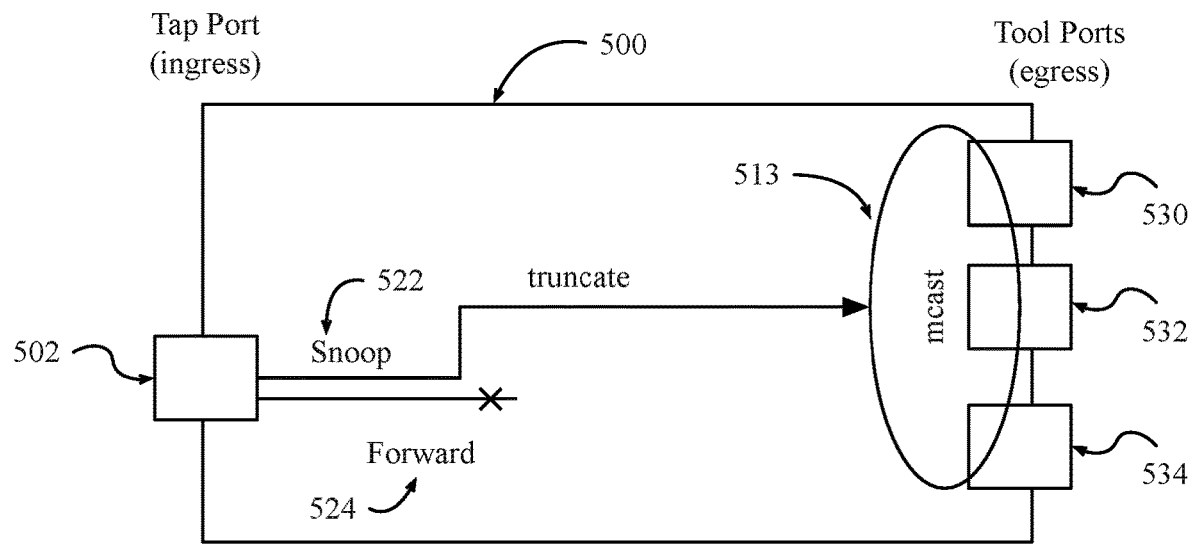
FIGS. 5A-5B are block diagrams of ingress and egress truncation via snoop actions, according to an embodiment.
Figure 5B:
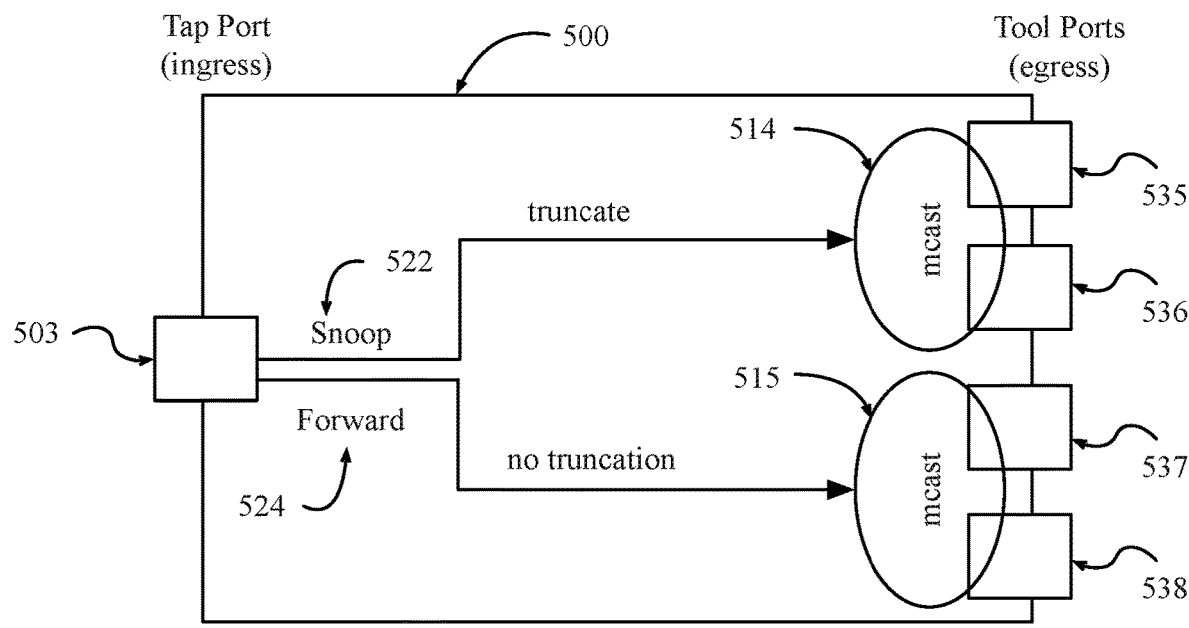

FIGS. 5A-5B are block diagrams of ingress and egress truncation via snoop actions, according to an embodiment. FIG. 5A and FIG. 5B illustrates a network processor 500, such as a system on a chip network processor having integrated ingress and egress pipelines. However, embodiments are not so limited, as the exemplary network processor 500 can also represent one or more fabric access processors that couple an ingress or egress interface to an internal switching fabric within a network element. In some embodiments, a single network element can contain multiple instances of the network processor 500.

As shown in FIG. 5A, to where ingress truncation is enabled for a tap port 502 all rules bound to the port, including traffic steering policies, would use the snoop action. In the case of FIG. 5A, the configured destination is a multicast group 513 that includes multiple tool ports 530, 532, 534. A snoop 522 can be performed on incoming data to process data received via the tap port 502 according to a configured snoop profile. The configured snoop profile can cause the snoop 522 to truncate the incoming data and forward the data to the mapped multicast group 513 containing the egress tool ports 530, 532, 534 associated with the tap port 502. When the tap port 502 is configured for ingress truncation, all data that is received at the port will be truncated. Accordingly, a forward 524 action is not required as all data received at the tap port will be truncated.

As shown in FIG. 5B, the network processor 500 can also be configured to perform egress truncation for a set of tool ports. Where egress truncation is enabled, whether incoming data is truncated is determined by the tool port to which the data is to be forwarded. When a tool port is configured for egress truncation, each tool group directing traffic to this port splits the port's destination list into truncated and non-truncated groups. The Truncated traffic is handled via the snoop 522 action. Non-truncated traffic is handled via the forward 524 action.

For example, data can be forwarded to a multicast group 514 that includes tool port 535 and 536. Where egress truncation is enabled for tool port 535 and 536, a snoop 522 action can be used to truncate incoming data received at an associated tap port 503 and output the incoming data to mapped tool ports 535, 536 of multicast group 514. However, egress truncation is not enabled for multicast group 515, which includes tool port 537 and port 538. Accordingly, data received at the tap port 503 that is destined to multicast group 515 can be forwarded to the destination ports via a forward 524 action.

Tool Groups

In one embodiment, tap aggregation and truncation can be configured on a network element using a concept of tool groups. A tool group is a collection of tool ports. Each tap port, and each traffic shaping or steering policy has a set of associated tool ports. Truncation can be configured on either a tap port or a tool port. When truncation is configured on a tap port (e.g., ingress truncation), the tool group(s) associated with the tap port will only receive truncated packets. When truncation is configured on a tool port (e.g., egress truncation), then only the copy sent to that tool port is truncated unless the tap port is configured for ingress truncation. In one embodiment, both ingress and egress truncation are achieved using snooping actions. The snoop actions can be configured via a snoop profile.

Figure 6:
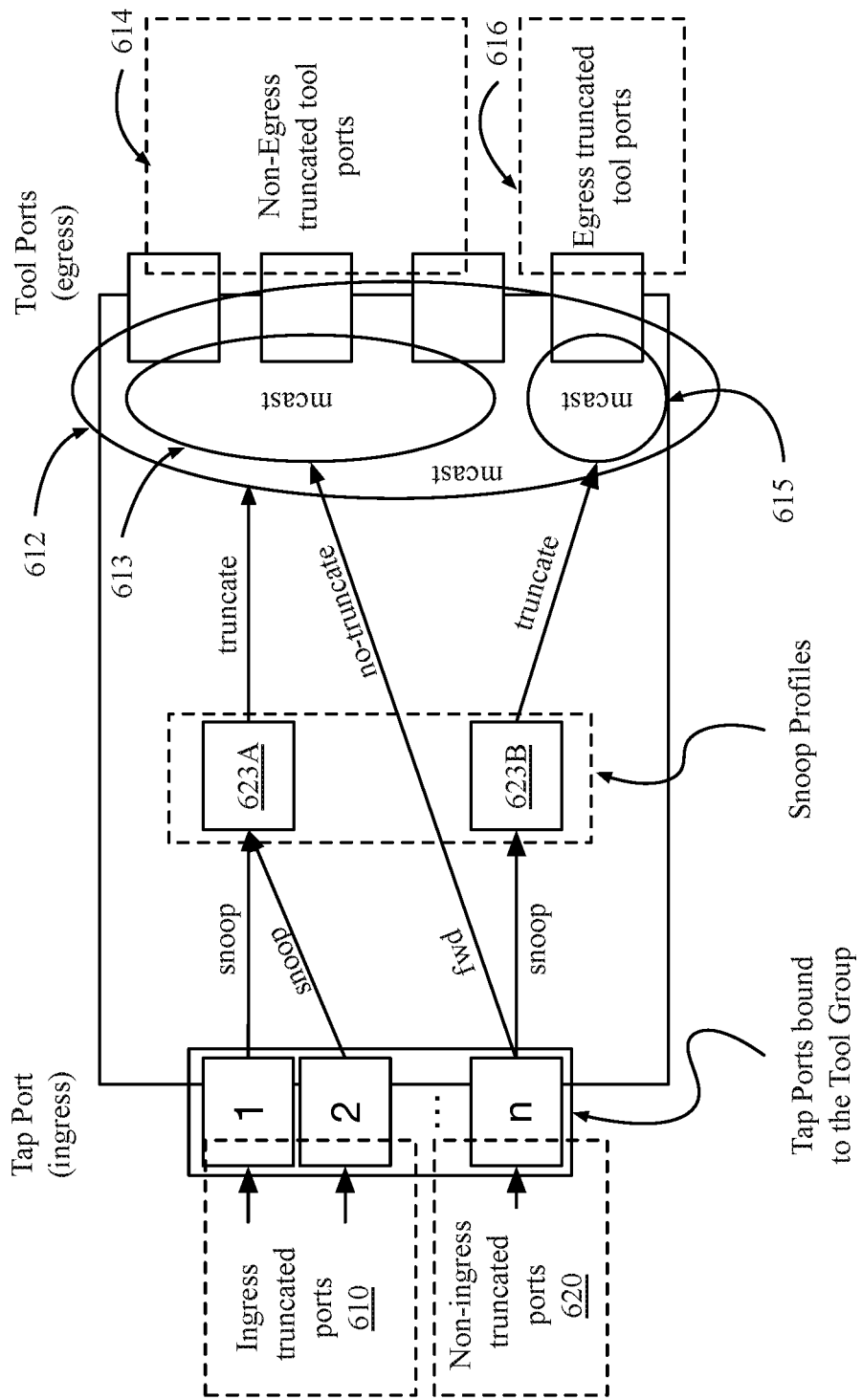
FIG. 6 illustrates snoop profile and multicast group usage within a single tool group, according to an embodiment.

FIG. 6 illustrates snoop profile and multicast group usage within a single tool group, according to an embodiment. In one embodiment, a tap port and traffic steering policy is associated with a tool group. A network processor can be configured to truncate all data received via a set of ingress truncated ports 610 while selectively truncating data received via non-ingress truncated ports 620. The truncation behavior associated with a tap port can be configured via the snoop profile associated with the tap port. For example, a first snoop profile 623A can be used for the set of ingress truncated ports 610, such that the ingress truncated ports 610 will snoop and truncate all traffic received via the ports. A second snoop profile 623B can be used for the non-ingress truncated ports 620 and data received via the non-ingress truncated ports 620 will be snooped and truncated if egress truncation is configured for the tool ports that are mapped to the non-ingress truncated ports 620. In one embodiment, each of the snoop profiles 623A-B can have a priority, which can be the same or different values. In a further embodiment, the priority of each of the snoop profiles 623A-B can be set to a maximum value.

The non-ingress truncated ports 620 bound to the tool group can be configured to forward or snoop and truncate based on the egress truncation configuration for the tool ports to which the non-ingress truncated ports 620 are mapped. For data that is destined for a second multicast group 613 of non-egress truncated ports 614, the non-ingress truncated ports 620 can forward the data to a destination without snooping the data. For data that is destined for a third multicast group 615 of egress truncated tool ports 616, a second snoop profile 623B is applied that causes the data to be truncated before being forwarded to the egress truncated tool ports 616 of the third multicast group 615.

Figure 7:
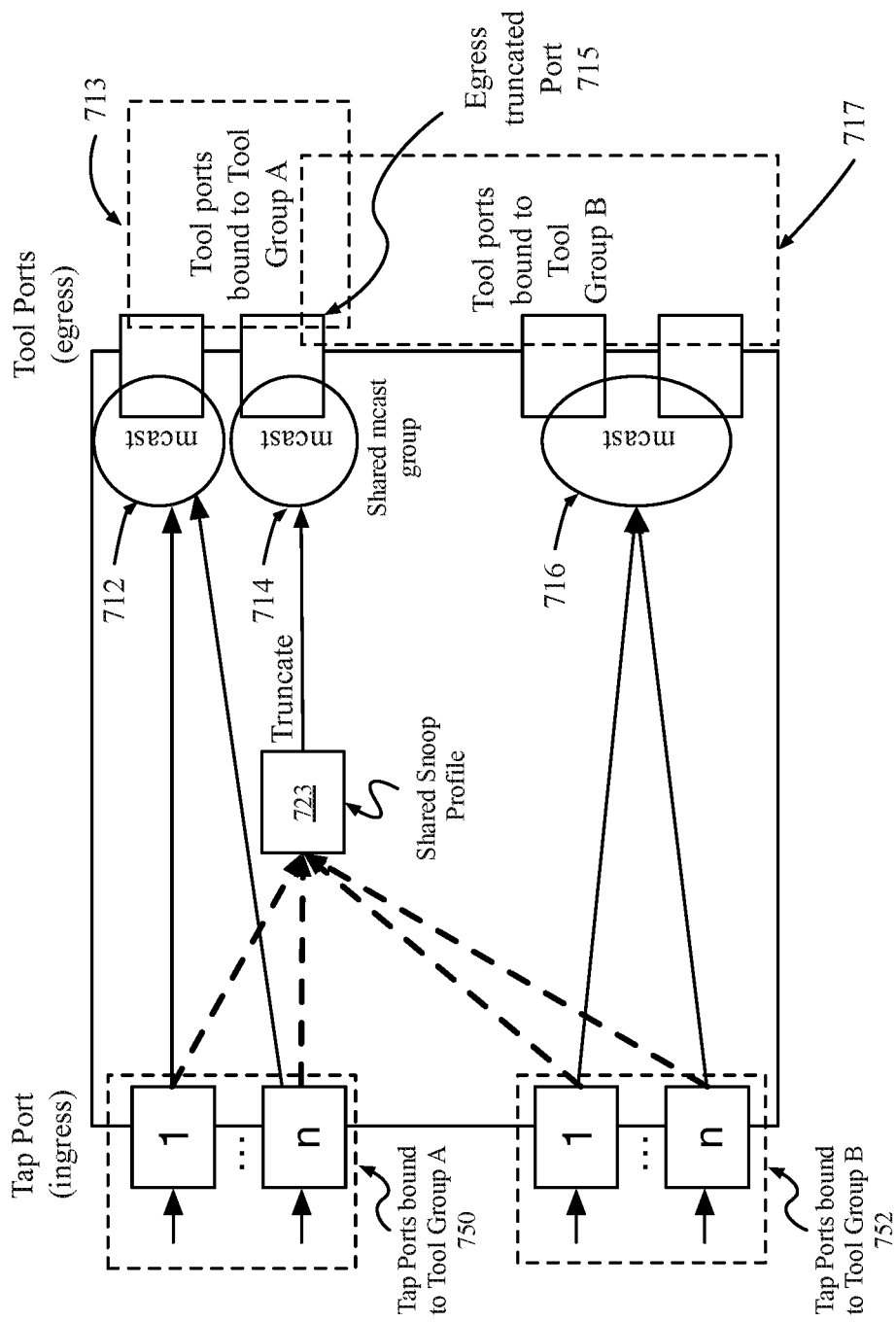
FIG. 7 illustrates snoop profile and multicast group sharing among multiple tool groups, according to an embodiment.

FIG. 7 illustrates snoop profile and multicast group sharing among multiple tool groups, according to an embodiment. Tap ports (750) bound to a first tool group (Tool Group A) can be configured to forward network data to a first multicast group 712 and snoop and forward data to a second multicast group 714 of tool ports that are bound to tool group A (713). Tap ports (752) bound to a second toll group (Tool Group B) can be configured to snoop network data to the second multicast group 714 and forward data to a third multicast group 716 of tool ports (717) bound to the second tool group.

As illustrated, the second multicast group 714 can be associated with multiple tool groups. This second multicast group 714 includes an egress truncated port 715. As both of the tool groups include the egress truncated port 715, a shared snoop profile 723 can be used by both tool groups to forward truncated data to the egress truncated port 715, without requiring each tool group to have a separate snoop profile. Additionally a tool group can use a multicast group directly for forwarding network data without snooping the data even if the same multicast group is used for snooping by a different tool group, for example, if the different tool group is using ingress truncation.

Tool Groups and Components

Snoop profiles can be a limited resource. To minimize the use of snoop profiles and to facilitate the sharing of snoop profiles, a 'tool group component' concept is introduced. A tool group component is a unique forwarding set that represents a collection of egress ports to which traffic is forwarded. In one embodiment, hardware resources are allocated on a per-component basis instead of directly to a tool group, enabling multiple tool groups to share the same component. A tool group is assigned a component based on the ports associated with the tool group. When a new tool group is created, the system determines if a component already exists that meets the forwarding needs of the tool group. Only if no component exists that contains the ports needed by the tool group, a new component is allocated. Reference counts are maintained for each component and a component (and associated HW resources, including snoop profile) is released when the component is no longer being referenced.

Figure 8B:
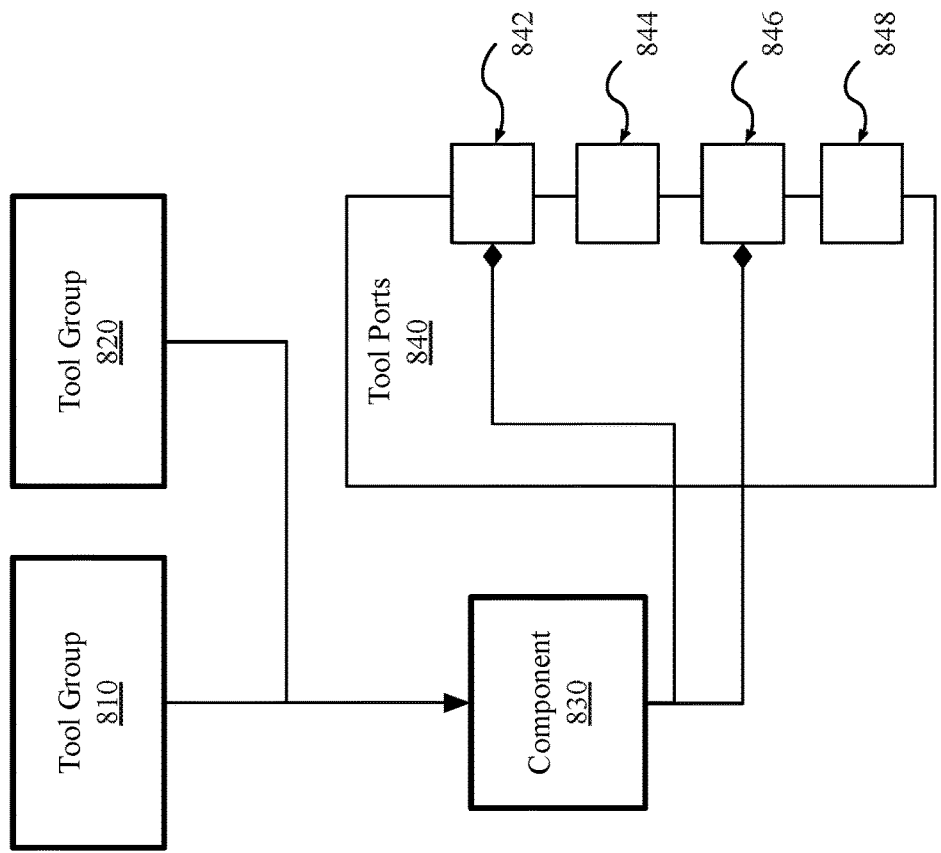
FIGS. 8A-8C illustrate tool group and component relationships for tap and tool ports, according to embodiments.
Figure 8A:
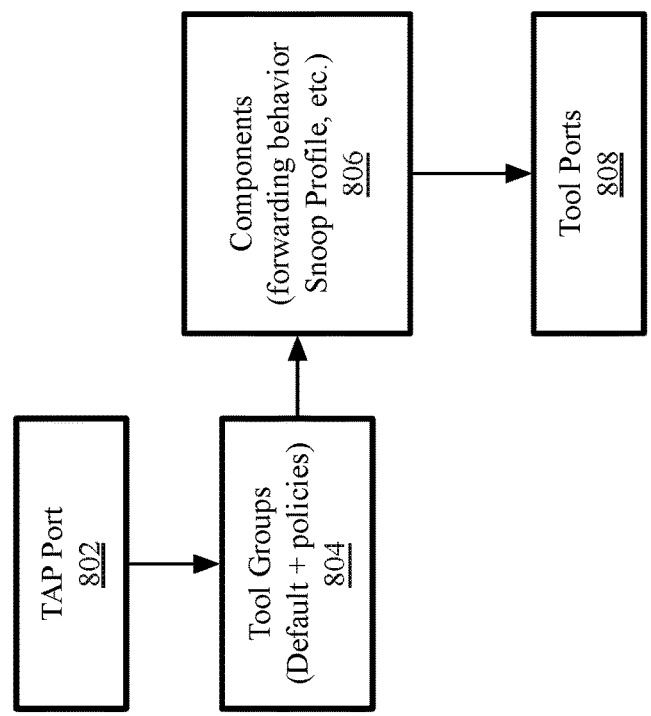
Figure 8C:
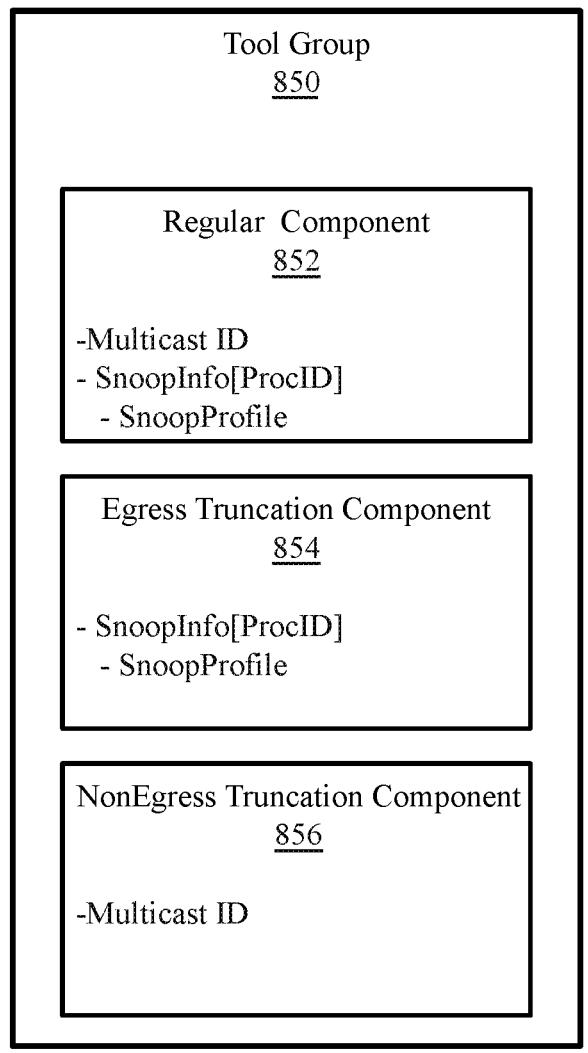

FIGS. 8A-8C illustrate tool group and component relationships for tap and tool ports, according to embodiments. As shown in FIG. 8A, a tap port 802 can be associated with one or more tool groups 804 that define a policy behavior for tap aggregation, which can include a default policy of forwarding (with or without truncation) all data to a specific set of tool ports 808, and/or a custom traffic shaping or steering profile. To detach policy configurations from the forwarding paths associated with the tool group 804, the forwarding behavior of a tool group can be determined via one or more group components 806. The tool group components 806 define the forwarding behavior for the tool group by specifying a specific set of tool ports 808 to which a tool group can forward data. In one embodiment, each of the components 806 has a unique multicast identifier allocated within the network element (e.g., multicast groups 513-514 of FIG. 5; multicast groups 612-615 of FIG. 6; multicast groups 712-716 of FIG. 7) to identify the tool ports 808 associated with the component.

As shown in FIG. 8B, multiple tool groups can share a component. As illustrated, a set of tool ports 842, 844, 846, 848 can be used to distribute aggregated network data to data analysis tools. A first tool group 810 having a first set of network data policies can be configured to distribute data to a multicast group that includes tool port 842 and tool port 844. If no tool group components exist that reference tool port 842 and tool port 844, a new tool group component 830 can be created. In creating the tool group component 830, a unique multicast identifier that references tool ports 842 and 846 is associated with the component 830.

Subsequent to the creation of the first tool group 810, a second tool group 820 can be created with a second set of network data policies. Although policy details may differ between the first tool group 810 and the second tool group 820, if the forwarding behavior for the first tool group 810 and the second tool group 820 is the same (e.g., tool port 842 and tool port 846), the tool groups can share the same component 830. Sharing the component 830 minimizes the amount of hardware allocations required for the second tool group 820, as additional duplicative resources such as multicast groups and snoop profiles will not be allocated.

Additionally, snoop profiles can be associated with the component 830 based on the truncation behavior for ports specified by the component 830. For example, if egress truncation is identified for the tool ports of the component 830, snoop profiles are allocated as needed to support egress truncation for those tool ports. Additionally, snoop profiles will be allocated as needed according to the configuration of tap ports associated with the tool group 830. For example, if tap port X without ingress truncation uses tool group 810 to forward to tool port 842 and tool port 846, no snoop profile is allocated. If at some point with tap port Y with ingress truncation is configured to use the same policy, tap port Y will use Tool Group 810. However, a snoop profile will be allocated in component 830 as component 830 is now used for truncation, even though tap port X still uses component 830 without truncation.

In one embodiment, snoop profiles are allocated asymmetrically across network processors to preserve snoop profile resources, such that for a given network processor, a snoop profile is not allocated until truncation is required for ports serviced by the specific network processor. With reference to FIG. 2, if each interface device 206A-C resided on a separate network processor ASIC, snoop profile are allocated on the network processor only if the snoop profile is relevant to the ports 216A-C associated with the interface devices 206A-C. For example, if a tool group component is only referenced by ports 216A, a snoop profile will be allocated only on interface 206A. If later the same tool group component is referenced by ports 216C on interface 206C, a snoop profile is allocated on the network processor associated with interface 206C. In one embodiment, a tool group component can specify the same multicast group destination while specifying different snoop profiles that are allocated on different network processors. Additionally, snoop profiles are not pre-allocated on a network processor. Instead, a lazy allocation is used in which the snoop profile resources are allocated only at the point at which the profile becomes needed.

FIG. 8C illustrates a relationship between tool group component data and network processor configuration, according to an embodiment. In one embodiment, a tool group (e.g., tool group 850) can include references to multiple types of components that can specify various types of forwarding behavior. A regular component 852 can be used in instances where ingress truncation is to be enabled for a tap port associated with the tool group 850, as well as when no truncation is enabled for any of the ports in the tool group 850. An egress truncation component 854 can be used when tool ports of the tool group specify egress truncation. The non-egress truncation component 856 can be used in conjunction with the egress truncation component 854 when some tool ports of the tool group are not egress truncated while other tool ports are egress truncated.

In one embodiment, the regular component 852 includes a reference to a destination multicast identifier for non-truncated traffic and snoop information for each relevant network processor for truncated traffic. A reference to a snoop profile can be maintained for each network processor having tap ports referencing the component. The egress truncation component can include similar information about snoop profile for each tap port forwarding to the tool group 850 for which ingress truncation is not enabled. Where egress truncation is enabled for less than all tool ports referenced by the tool group 850, the tap ports which are not configured for ingress truncation and that forward traffic to tool group 850 can use the non-egress truncation component 856. The non-egress truncation component 856 can include a multicast identifier including tool ports of the tool group 850 for which egress truncation is not enabled.

The tool group component data can be used to configure the relevant set of network processors for the tool group 850. For each tap port forwarding to the tool group 850, if ingress truncation configured on the tap port, the snoop profiles found in the regular component 852 can be applied to the tap port and regularly forwarded traffic can be dropped. A snoop destination map of the network element corresponding to the tap port can be set to reference the tool ports to which the tap port is mapped.

If no ingress truncation is configured for the tap port but an egress truncation component 854 exists in the tool group 850, the tap port can be configured with the snoop profiles stored in the egress truncation component 854, while any tool ports for which egress truncation is disabled can be set up as regular forwarding destinations based on the multicast identifier for those tool ports found in non-egress truncation component 856.

If no truncation is configured for the tool group, in one embodiment, the regular component 852 can be used. No snoop profile is applied for the tap port and the tap port can be configured to use the multicast identifier for destination tool ports found in regular tool group component 852 to configure a forwarding action to forward incoming network data without truncation.

Figure 9:
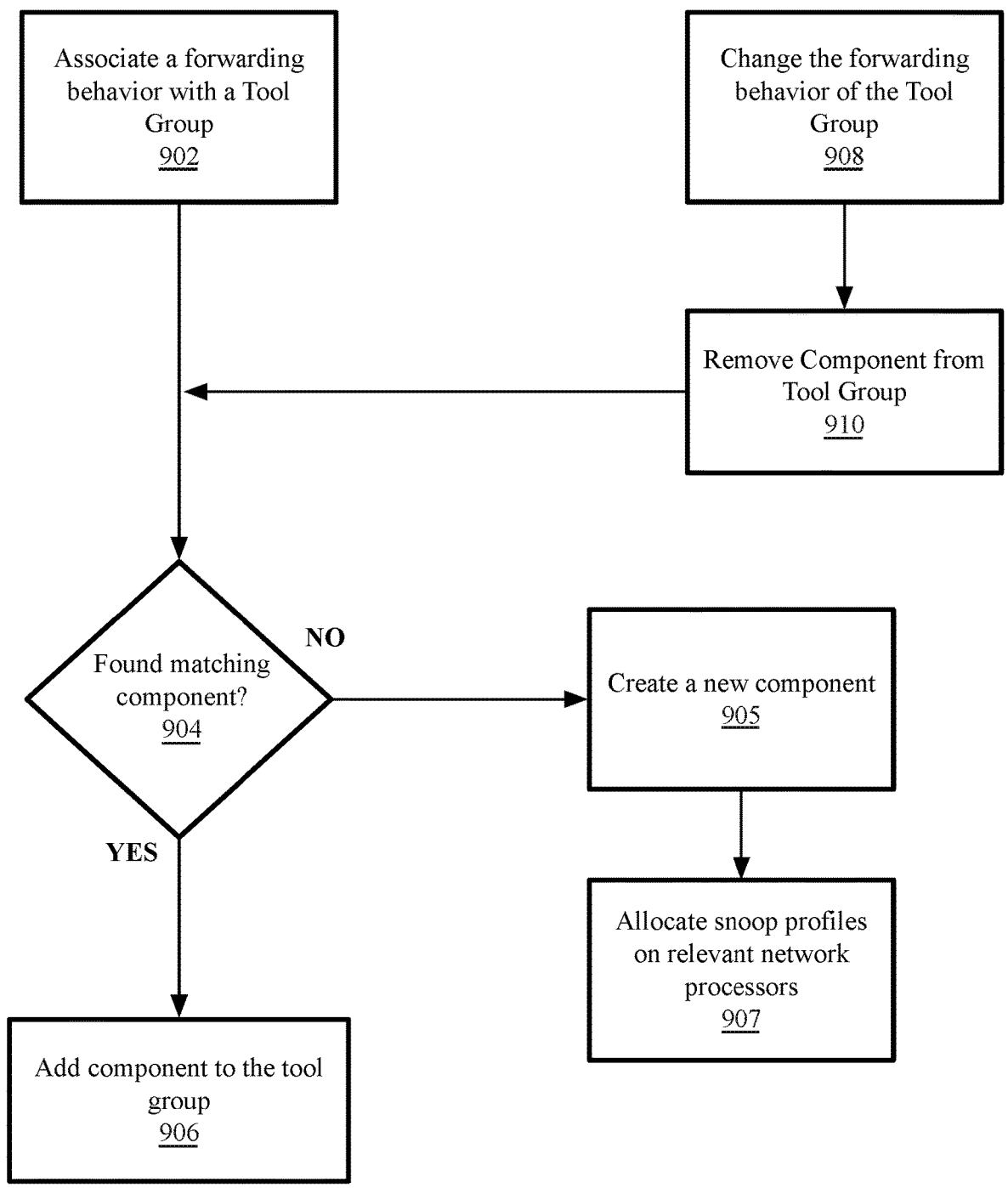
FIG. 9 illustrates an allocation process for components and tool groups, according to an embodiment.

FIG. 9 illustrates an allocation process 900 for components and tool groups, according to an embodiment. In one embodiment, control plane logic for a network element can receive a request to associate a forwarding behavior with a tool group, as shown at 902. The logic can then search for a matching component in a component list, as shown at 904.

If the control plane logic locates a matching component, the logic can add the component to the tool group, as shown at 906. If a component does not exist that defines the required forwarding behavior, such that the required forwarding behavior has not been defined and hardware resources for the forwarding behavior have not been allocated on the network element, the control plane logic can create a new component at 905. Creating the new component at 905 includes allocating the necessary hardware resources for the component. For example, as shown at 907, the control plane logic can allocate snoop profiles on the network processors that are relevant to the component. The relevant network processors are the set of network processors that include tap ports using the component. Once the component is created, any tool group on the network element that requires the same forwarding behavior can use the newly created component.

Similar logic can be performed in the event the logic receives a request to change the forwarding behavior of the tool group. If the control plane logic receives a request to change the forwarding behavior of the tool group, as shown at 908, the logic can remove the component from the tool group at 910 and replace the component with an existing component in the component list at 906 or create a new component at 905, as determined at 904.

Each component has an associated reference count to track the number of references to the component. Once a component is no longer referenced, the component can be deleted and the associated hardware resources can be released. If the forwarding behavior for a tool group changes, the component cannot be updated, as the component may be shared with other tool groups that rely on the forwarding behavior defined by the component. Accordingly, when the forwarding behavior for a tool group changes, a new component matching the new forwarding behavior is selected. If a component associated with the new behavior does not exist, a new component is created and additional hardware resources are allocated as needed. In one embodiment, a component can additionally include a reverse mapping to each tool group that references the component. In such embodiment, the reverse mapping can be used as a reference count for the component. A component and the associated resources can be released once the component is no longer referenced by any tool groups.

Figure 10:
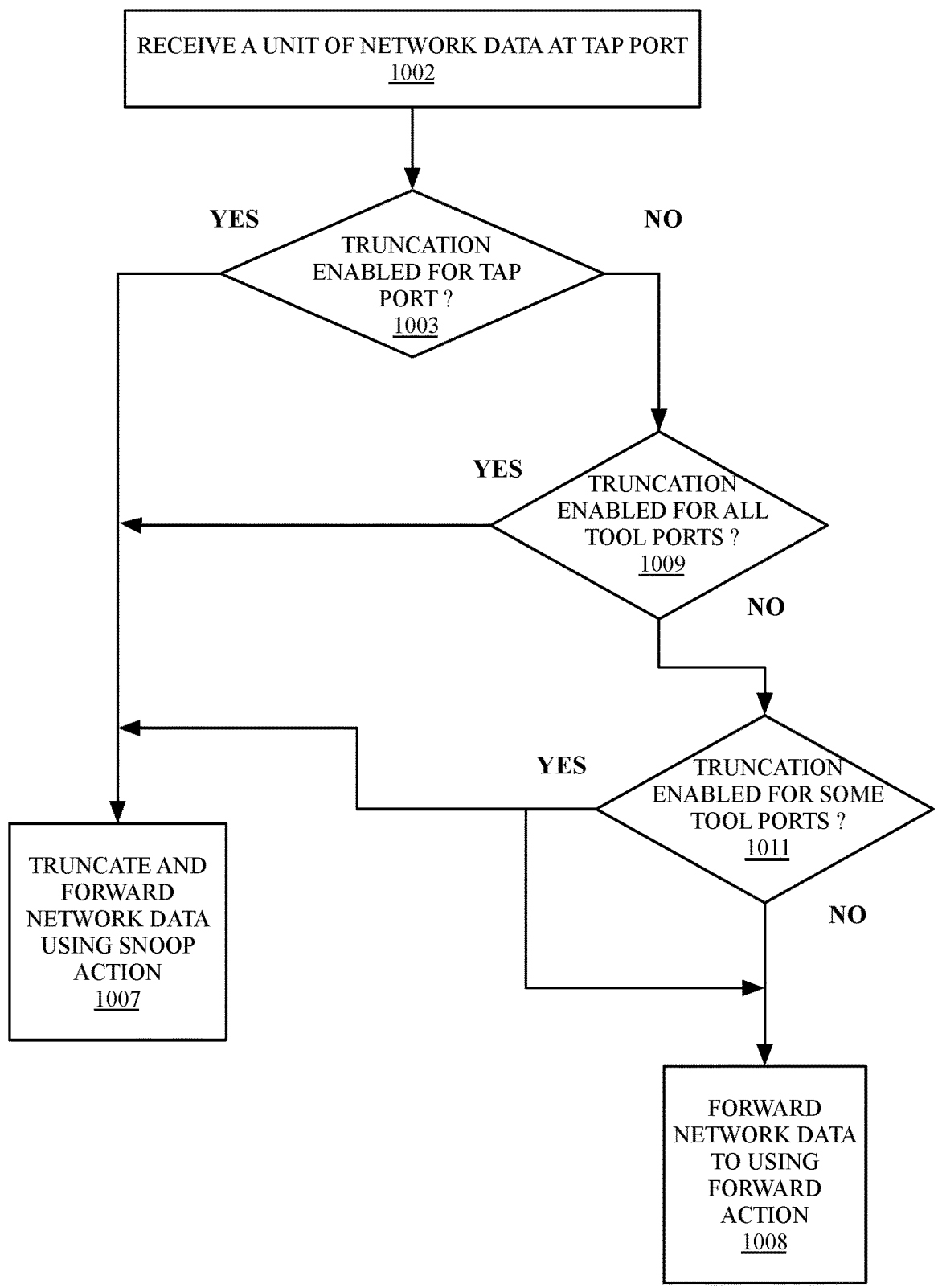
FIG. 10 is a flow diagram of a data handling process at a tap aggregation port, according to an embodiment.

FIG. 10 is a flow diagram of a data handling process 1000 at a tap aggregation port, according to an embodiment. In one embodiment, a forwarding or data plane as configured as described herein can receive a unit of network data at a tap port, as shown at 1002. If truncation is enabled for the tap port (e.g., ingress truncation), as determined at 1003 the network element can truncate and forward the unit of network data via a snoop action, as shown at 1007. If truncation is not enabled for the tap port at 1003, if truncation is enabled for all destination tool port, as determined at 1009, the network element can truncate and forward the unit of network data via a snoop action, as shown at 1007. If truncation is not enabled for the tap port at 1003 or the tool port at 1009, the network element can forward the unit of network data to the destination tool port using a forward action, as shown at 1008. If truncation is enabled for some but not all tool ports the unit of network data can be truncated and forwarded using the snoop action at 1007 for the tool ports for which egress truncation is enabled and can be forwarded without truncation using the forward action at 1008.

Figure 11:
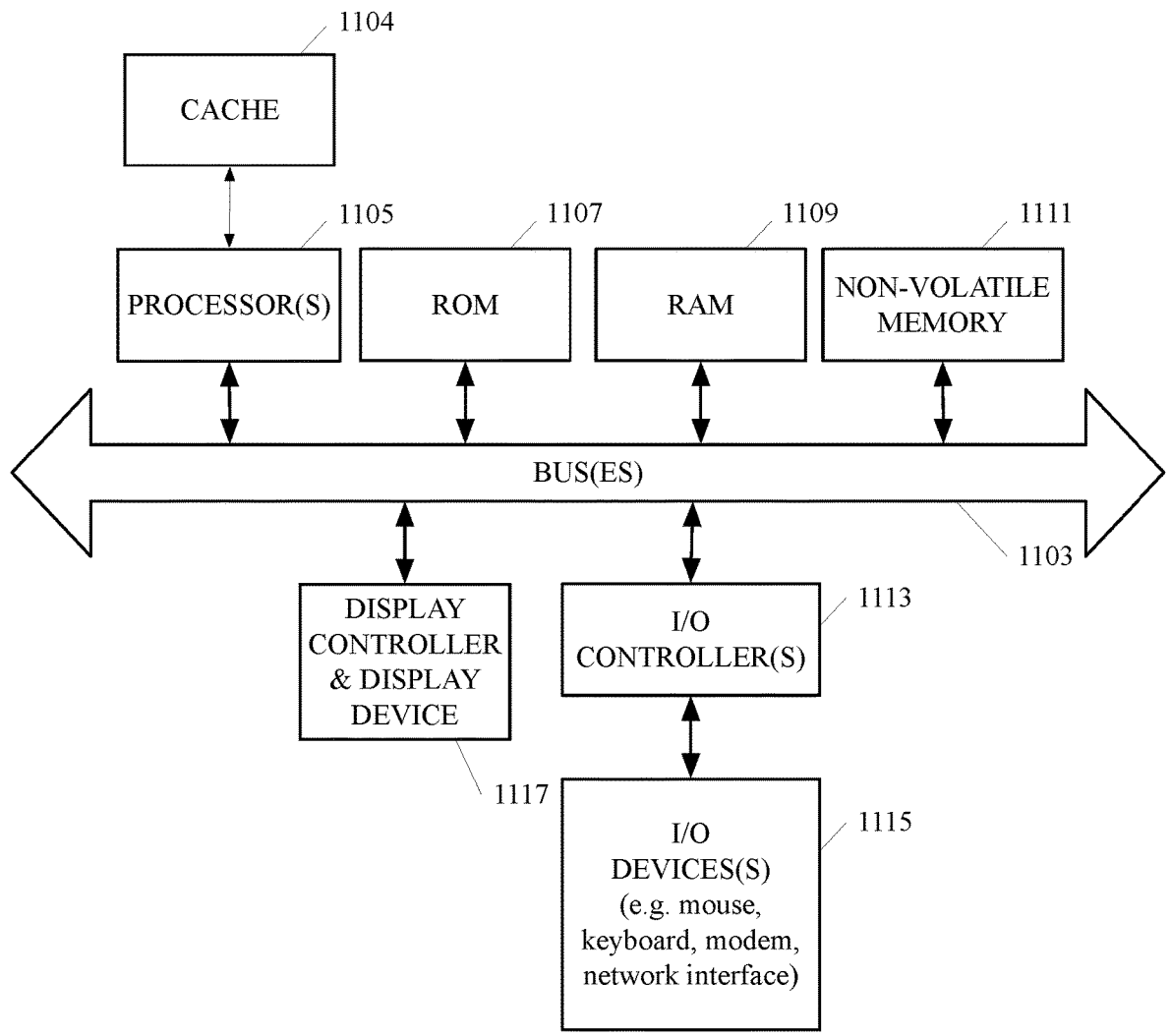
FIG. 11 illustrates one example of a typical computer system, which may be used in conjunction with the embodiments described herein.

FIG. 11 shows one example of a data processing system 1100, which may be used with one embodiment of the present invention. For example, the system 1100 may be implemented including a network element 102 as shown in FIG. 1. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the data processing system 1100 includes a bus 1103 which is coupled to a microprocessor(s) 1105 and a ROM (Read Only Memory) 1107 and volatile RAM 1109 and a non-volatile memory 1111. The microprocessor 1105 may retrieve the instructions from the memories 1107, 1109, 1111 and store the instructions in a cache 1104 for execution to perform operations described above. The bus 1103 interconnects these various components together and also interconnects components 1105, 1107, 1109, and 1111 to a display controller and display device 1117 and to peripheral devices such as input/output (I/O) devices which may be mice, keyboards, modems, network interfaces, printers and other devices which are well known in the art. In one embodiment, the system 1100 includes a plurality of network interfaces of the same or different type (e.g., Ethernet copper interface, Ethernet fiber interfaces, wireless, and/or other types of network interfaces). In this embodiment, the system 1100 can include a forwarding engine to forward network date received on one interface out another interface.

Typically, the input/output devices 1115 are coupled to the system through input/output controllers 1113. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 12:
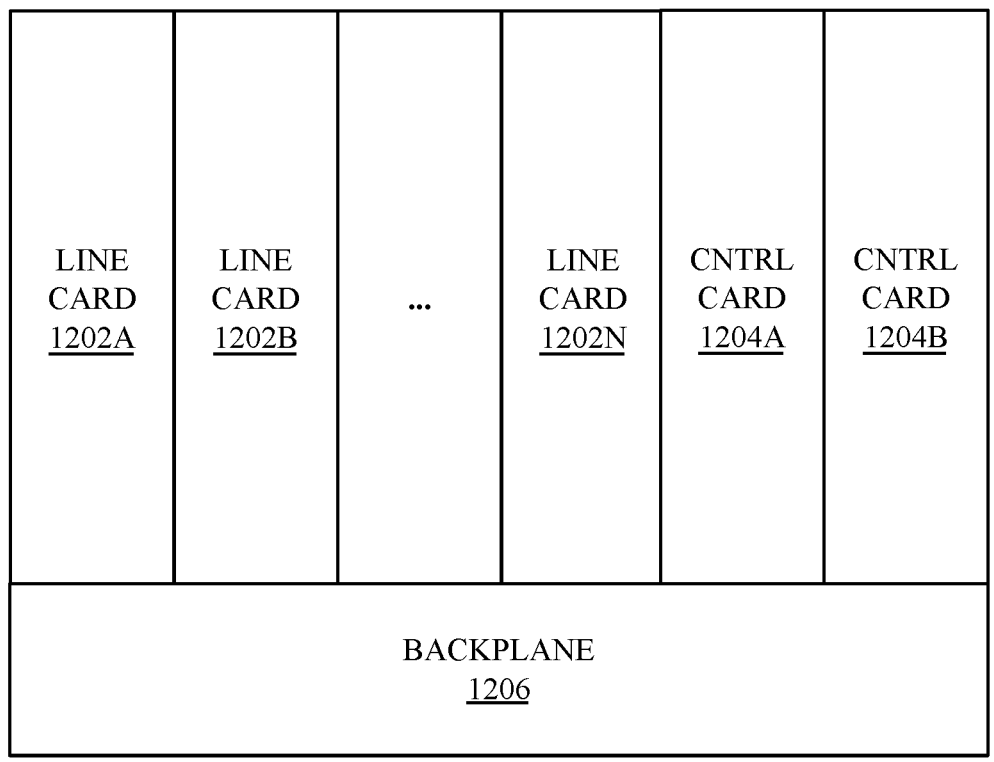
FIG. 12 is a block diagram of one embodiment of an exemplary network element that handles a split port.

FIG. 12 is a block diagram of one embodiment of an exemplary network element 1200, according to an embodiment. In FIG. 12, the backplane 1206 couples to the line cards 1202A-N and controller cards 1204A-B. While in one embodiment, the controller cards 1204A-B control the processing of the traffic by the line cards 1202A-N, in alternate embodiments, the controller cards 1204A-B, perform the same and/or different functions (e.g., processes changes to forwarding information, etc.). In one embodiment, the line cards 1202A-N process and forward traffic according to the network policies received from controller cards the 1204A-B. In this embodiment, one, some, or all of the line cards 1202A-N includes modules to perform tap aggregation and truncation as illustrated in FIG. 4. It should be understood that the architecture of the network element 1200 illustrated in FIG. 12 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "performing," "computing," "adding," "dropping," "suppressing," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A network element for performing tap aggregation, the network element comprising:
   a first tap port to couple with a tap switch;
   a set of tool ports to transmit network data received from the first tap port to a data analyzer; and
   data plane logic to manage a mapping between the first tap port and the set of tool ports, wherein a first tool port in the set of tool ports is to perform egress truncation and the data plane logic is to perform a selective copying action to truncate a first unit of network data to be forwarded to the first tool port and a forward action to forward a second unit of network data to a second tool port in the set of tool ports without truncation.

2. The network element as in claim 1, wherein the first tool port is a port in a multicast group of ports and the data plane logic is to truncate the first unit of network data and forward the first unit of network data to the multi cast group of ports.

3. The network element as in claim 1, wherein the second tool port is a port in a multicast group of ports and the data plane logic is to forward the second unit of network data to the multicast group of ports without truncating the second unit of network data.

4. The network element as in claim 1, wherein the first unit of network data is associated with a first network protocol and the second unit of network data is associated with a second network protocol, the first network protocol different from the second network protocol.

5. The network element as in claim 1, additionally including a memory to store a tool group, the tool group associated with a forwarding path and a forwarding policy.

6. The network element as in claim 5, wherein the data plane logic is to truncate and forward network data based on the forwarding policy.

7. The network element as in claim 6, wherein the tool group is associated with a tool group component, the tool group component to define the forwarding path of the tool group.

8. The network element as in claim 7, wherein the tool group component is to identify a set of hardware resources for the tool group, the set of hardware resources including a multicast group that identifies the set of tool ports.

9. The network element as in claim 8, wherein the tool group component is associated with one or more snoop profiles, the snoop profile to perform snoop truncation for the data plane logic.

10. The network element as in claim 1, additionally including a second tap port to couple with a second tap switch, the second tap port to perform ingress truncation.

11. The network element as in claim 10, wherein the data plane logic is to truncate a third unit of network data to be forwarded to the second tool port in the set of tool ports.

12. The network element as in claim 10, wherein forwarding hardware of the network element lacks native truncation support at the ingress interface and a selective copy action is applied based on the second tap port.

13. The network element as in claim 10, wherein forwarding hardware of the network element lacks native truncation support at the ingress interface and a selective copy action is applied via packet filtering hardware of the data plane logic.

14. A network system comprising:
   a first set of network elements, each network element in the first set of network elements to operate as a tap switch; and
   an aggregation network element to receive network data from the first set of network elements and forward the network data to a set of data analyzers, the aggregation network element including data plane logic to selectively truncate network data received from the first set of network elements via a selective copy action before the network data is to be forwarded to the set of data analyzers via a set of tool ports, wherein a first tool port in the set of tool ports is to perform egress truncation.

15. The network system as in claim 14, wherein the data plane logic of the aggregation network element is to selectively truncate network data associated with a tool group, wherein the tool group represents a forwarding destination associated with a tap port.

16. The network system as in claim 15, wherein the tool group is associated with a network data steering policy for data to be forwarded to the set of data analyzers.

17. The network system as in claim 16, wherein the tool group is associated with a tool group component, the tool group component to uniquely specify a forwarding path for the tool group.

18. The network system as in claim 17, wherein the tool group component is associated multiple tool groups.

19. A method comprising:
   receiving a unit of network data at a tap port of a network element;
   forwarding the unit of network data to a set of tool ports based on data plane logic, the set of tool ports to transmit network data received from the tap port to a data analyzer and the data plane logic to manage a mapping between the tap port and the set of tool ports, wherein a first tool port in the set of tool ports is to perform egress truncation and the data plane logic is to perform a selective copying action to truncate a first unit of network data to be forwarded to the first tool port and a forward action to forward a second unit of network data to a second tool port in the set of tool ports without truncation.

20. The method of claim 19, wherein the first unit of network data is associated with a first network protocol and the second unit of network data is associated with a second network protocol, the first network protocol different from the second network protocol.

21. The method of claim 19, wherein the network element includes a memory to store a tool group, the tool group associated with a forwarding path and a forwarding policy.

22. The method of claim 21, wherein the data plane logic is to truncate and forward network data based on the forwarding policy.

* * * * *